(12) United States Patent
Wang et al.

(10) Patent No.: US 10,782,770 B2
(45) Date of Patent: Sep. 22, 2020

(54) POWER MANAGEMENT METHOD AND SYSTEM

(71) Applicant: HUAWEI TECHNOLOGIES CO., LTD., Shenzhen, Guangdong (CN)

(72) Inventors: Binbin Wang, Shenzhen (CN); Yumin Wu, Hangzhou (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 92 days.

(21) Appl. No.: 16/102,343

(22) Filed: Aug. 13, 2018

(65) Prior Publication Data

US 2018/0348845 A1 Dec. 6, 2018

Related U.S. Application Data

(63) Continuation of application No. PCT/CN2016/098356, filed on Sep. 7, 2016.

(30) Foreign Application Priority Data

Feb. 14, 2016 (CN) .......................... 2016 1 0084465

(51) Int. Cl.
*G06F 1/32* (2019.01)
*G06F 1/3234* (2019.01)
(Continued)

(52) U.S. Cl.
CPC .............. *G06F 1/3243* (2013.01); *G06F 1/26* (2013.01); *G06F 1/28* (2013.01); *G06F 1/3203* (2013.01);
(Continued)

(58) Field of Classification Search
CPC .... G06F 1/3243; G06F 1/3206; G06F 1/3287; G06F 9/4405; G06F 9/4401;
(Continued)

(56) References Cited

U.S. PATENT DOCUMENTS 6,526,507 B1 * 2/2003 Cromer ................... H04L 63/04
370/260
8,375,228 B2 2/2013 Kashyap
(Continued)

FOREIGN PATENT DOCUMENTS

CN 101609406 A 12/2009
CN 102193804 A 9/2011
(Continued)

*Primary Examiner* — Volvick Derose
(74) *Attorney, Agent, or Firm* — Womble Bond Dickinson (US) LLP

(57) ABSTRACT

The present disclosure discloses a power management method to improve a power-on effect of a multinode system. In the power management method provided in the present disclosure, after a power management module delivers a power-on instruction to each node in the multi-node system, a PCH of each node loads a BIOS from a local flash to perform a power-on process. Compared with the prior art in which a PCH of a master node is responsible for loading BIOSs of all nodes in a multi-node system, the method provided in the present disclosure can reduce burden on the PCH of the master node, and accelerate a power-on speed of the system, so that a better power-on effect is achieved. The present disclosure further provides a related multi-node system.

8 Claims, 3 Drawing Sheets

(51) Int. Cl.
*G06F 1/3293* (2019.01)
*G06F 1/28* (2006.01)
*G06F 1/26* (2006.01)
*G06F 1/3203* (2019.01)
*G06F 9/4401* (2018.01)
*G06F 1/3287* (2019.01)
*G06F 1/3206* (2019.01)
*G06F 1/3209* (2019.01)

(52) U.S. Cl.
CPC .......... *G06F 1/3206* (2013.01); *G06F 1/3253* (2013.01); *G06F 1/3287* (2013.01); *G06F 1/3293* (2013.01); *G06F 9/4401* (2013.01); *G06F 9/4405* (2013.01); *G06F 1/3209* (2013.01)

(58) Field of Classification Search
CPC ........ G06F 1/3203; G06F 1/3253; G06F 1/26; G06F 1/28; G06F 1/3293
USPC .......................................................... 713/323
See application file for complete search history.

(56) References Cited

U.S. PATENT DOCUMENTS

| | | | | |
|---|---|---|---|---|
| 9,519,786 | B1* | 12/2016 | Laredo | G06F 8/654 |
| 9,535,676 | B1* | 1/2017 | Forehand | G06F 8/61 |
| 2002/0152473 | A1* | 10/2002 | Unger | H04H 20/426 |
| | | | | 725/120 |
| 2002/0188934 | A1* | 12/2002 | Griffioen | G06F 8/65 |
| | | | | 717/170 |
| 2003/0084342 | A1* | 5/2003 | Girard | G06F 21/305 |
| | | | | 726/4 |
| 2006/0020837 | A1* | 1/2006 | Rothman | G06F 9/4416 |
| | | | | 713/310 |
| 2006/0174087 | A1* | 8/2006 | Hashimoto | G06F 9/5077 |
| | | | | 711/173 |
| 2007/0234332 | A1* | 10/2007 | Brundridge | G06F 8/65 |
| | | | | 717/168 |
| 2007/0260790 | A1* | 11/2007 | Chen | G06F 8/65 |
| | | | | 710/110 |
| 2008/0086652 | A1* | 4/2008 | Krieger | G06F 1/26 |
| | | | | 713/330 |
| 2008/0189693 | A1* | 8/2008 | Pathak | G06F 8/65 |
| | | | | 717/168 |
| 2009/0016251 | A1* | 1/2009 | Adams | H04W 52/0229 |
| | | | | 370/311 |
| 2009/0241103 | A1* | 9/2009 | Pennisi | G06F 8/65 |
| | | | | 717/173 |
| 2010/0250832 | A1* | 9/2010 | Zhang | G06F 11/1441 |
| | | | | 711/103 |
| 2012/0042177 | A1* | 2/2012 | Kong | G06F 1/26 |
| | | | | 713/300 |
| 2012/0124357 | A1* | 5/2012 | Zimmer | G06F 1/3203 |
| | | | | 713/2 |
| 2013/0007430 | A1* | 1/2013 | Fan | G06F 9/445 |
| | | | | 713/1 |
| 2013/0181524 | A1* | 7/2013 | Lin | H01R 13/7137 |
| | | | | 307/39 |
| 2014/0189337 | A1* | 7/2014 | Lin | G06F 9/4418 |
| | | | | 713/2 |
| 2014/0189673 | A1* | 7/2014 | Stenfort | G06F 8/65 |
| | | | | 717/170 |
| 2014/0250430 | A1* | 9/2014 | Proud | A61B 5/0024 |
| | | | | 717/168 |
| 2015/0205676 | A1 | 7/2015 | Zheng et al. | |
| 2015/0348580 | A1* | 12/2015 | van Hoff | G11B 19/20 |
| | | | | 348/38 |
| 2015/0370661 | A1 | 12/2015 | Swanson et al. | |
| 2016/0116967 | A1* | 4/2016 | Chung | G06F 9/4416 |
| | | | | 713/323 |

FOREIGN PATENT DOCUMENTS

| | | |
|---|---|---|
| CN | 102375521 A | 3/2012 |
| CN | 103218030 A | 7/2013 |
| CN | 103365696 A | 10/2013 |
| CN | 103733180 A | 4/2014 |
| CN | 103995575 A | 8/2014 |
| CN | 104615500 A | 5/2015 |
| CN | 105204965 A | 12/2015 |

* cited by examiner

POWER MANAGEMENT METHOD AND SYSTEM

CROSS-REFERENCE TO RELATED APPLICATIONS

This application is a continuation of International Application No. PCT/CN2016/098356, filed on Sep. 7, 2016, which claims priority to Chinese Patent Application No. 201610084465.9, filed on Feb. 14, 2016. The disclosures of the aforementioned applications are hereby incorporated by reference in their entireties.

TECHNICAL FIELD

The present disclosure relates to the power management field, and in particular, to a power management method and a system.

BACKGROUND

Blade servers are mainly used in scenarios such as big data and cloud to implement storage and computing functions. In a blade server, each server unit may be considered as a node. Power-related operations such as power-on and power-off of the node are managed and implemented by a Platform Control Hub (PCH) of the node.

A current blade server usually includes multiple nodes. One of the nodes is a master node, and other nodes are slave nodes. The master node and the slave nodes form a multi-node system together. A PCH of the master node is responsible for managing functions such as power-on and power-off of all the nodes together, to ensure consistency between the nodes. PCHs of the slave nodes are not used, and may be set to a sleep state.

However, in actual application, when a PCH of one node is used to manage power-on and power-off of all nodes, a workload of the PCH of the master node is extremely heavy, a relatively long power-on delay is caused, and a good power-on effect cannot be achieved.

SUMMARY

The present disclosure provides a power management method to improve a power-on effect of a multi-node system. The present disclosure further provides a related multi-node system.

A first aspect of the present disclosure provides a power management method, applicable to a multi-node system. The multi-node system includes a power management module and multiple nodes. One of the multiple nodes acts as a master node, and other nodes act as slave nodes. Each node includes at least a central processing unit (CPU), a complex programmable logic device (CPLD), a PCH, and a flash. When determining that the multi-node system is to be powered on, the power management module sends a power-on instruction to each node, to instruct to power on the node. After receiving the power-on instruction sent by the power management module, each node starts to be powered on. A power-on operation of each node is controlled by a local PCH of the node, and the power-on operations of the nodes are independent of each other. After the slave node is powered on, a local PCH of the slave node is switched to a sleep state. In the present disclosure, the PCH of each node loads a Basic Input/Output System (BIOS) from the local flash, to perform a power-on process. Compared with the prior art in which a PCH of a master node is responsible for loading BIOSs of all nodes in a multi-node system, the method provided in this embodiment of the present disclosure can reduce burden on the PCH of the master node, and accelerate a power-on speed of the system, so that a better power-on effect is achieved.

Optionally, the PCH of the slave node may load a BIOS from the local flash only at an initial stage of power-on, and after a local memory is initialized, continue to load a BIOS from a flash of the master node instead. In this way, all nodes continue to load the BIOS from the flash of the master node after the memory is initialized, so that relatively high consistency can be ensured after power-on.

Optionally, when the multi-node system is to be powered off, the PCH of the master node pulls down a sleep control signal, and sends, to the power management module, the sleep control signal that is pulled down. The sleep control signal is used to instruct to power off the nodes. The master node is powered off after sending the sleep control signal to the power management module. After receiving the sleep control signal, the power management module sends the sleep control signal to each slave node. After receiving the sleep control signal, the slave node is powered off and isolates abnormal power-off information. After being powered off, the slave node pulls down the local sleep control signal, to ensure that statuses of the PCHs of the nodes in the multi-node system may be consistent when the multi-node system starts a next power-on process.

Optionally, the PCH of the master node may determine, after receiving a power-off instruction sent by a user, a node, or another device, that the multi-node system is to be powered off, and trigger the operation of pulling down the sleep control signal. Alternatively, the PCH of the master node may determine, when a CPU of the master node generates a thermal_trip signal, that the multi-node system is to be powered off, and trigger the operation of pulling down the sleep control signal. Alternatively, after generating a thermal_trip signal, a CPU of the slave node may report the generated thermal_trip signal to the power management module, and the power management module delivers the thermal_trip signal to the PCH of the master node. After receiving the thermal_trip signal of the slave node, the PCH of the master node determines that the multi-node system is to be powered off, and triggers the operation of pulling down the sleep control signal.

Optionally, before the slave node performs hot reset, a local CPLD of the slave node pulls down a PCH power OK signal and a system power OK signal, to reactivate a direct media interface (DMI) bus between the PCH and the CPU of the slave node. Then, each node performs a hot reset operation. After completing the hot reset operation, the slave node disables the DMI bus. With this method, in this embodiment of the present disclosure, hot reset of the multi-node system is implemented while hot swapping is still supported. Therefore, flexibility of the multi-node system is improved.

A second aspect of the present disclosure provides a multi-node system. The multi-node system includes a power management module and multiple nodes. One of the multiple nodes acts as a master node, and other nodes act as slave nodes. Each node includes at least a CPU, a CPLD, a PCH, and a flash. The power management module is configured to: when determining that the multi-node system is to be powered on, send a power-on instruction to each node, to instruct to power on the node. After receiving the power-on instruction sent by the power management module, each node starts to be powered on. The PCH of each node is configured to load a BIOS from the local flash during power-on, and switch to a sleep state after being powered on.

Optionally, the PCH of each node is further configured to load the BIOS from the local flash during the power-on until a local memory is initialized. After the local memory is initialized, a PCH of the master node continues to load a BIOS from a local flash, but a PCH of the slave node continues to load a BIOS from the flash of the master node instead.

Optionally, the PCH of the master node is further configured to: when the multi-node system is to be powered off, pull down a local sleep control signal, send, to the power management module, the sleep control signal that is pulled down, and then power off the master node. The power management module is further configured to send the sleep control signal to each slave node after receiving the sleep control signal sent by the PCH of the master node. Each slave node is further configured to be powered off after receiving the sleep control signal sent by the power management module, and pull down the local sleep control signal after being powered off.

Optionally, the master node may use multiple methods to determine to be powered off and pull down the local sleep control signal. For example, the PCH of the master node may receive a power-off instruction, to trigger the operation of pulling down the sleep control signal. Alternatively, a CPU of the master node is configured to generate a thermal_trip signal, to trigger the operation of pulling down the sleep control signal by the PCH of the master node. Alternatively, the power management module is further configured to send a thermal_trip signal to the master node. After receiving the thermal_trip signal, the master node triggers the operation of pulling down the sleep control signal by the PCH of the master node.

Optionally, if the system is to perform hot reset, a CPLD of each slave node is further configured to activate a DMI bus between a local CPU and the local PCH before the hot reset. After a DMI bus between the local CPU and the local PCH of each node is activated, the node performs a hot reset operation. After completing the hot reset operation, the slave node disables the DMI bus between the local CPU and the local PCH.

In the power management method provided in the present disclosure, after the power management module delivers the power-on instruction to each node in the multi-node system, the PCH of each node loads the BIOS from the local flash to perform the power-on process. Compared with the prior art in which a PCH of a master node is responsible for loading BIOSs of all nodes in a multi-node system, the method provided in the embodiments of the present disclosure can reduce burden on the PCH of the master node, and accelerate a power-on speed of the system, so that a better power-on effect is achieved.

DESCRIPTION OF EMBODIMENTS

The present disclosure provides a power management method to improve a power-on effect of a multi-node system. The present disclosure further provides a related multi-node system. The power management method and the multi-node system are separately described below.

A blade server is a low-cost server platform that is designed for special application industries and high-density computer environments. In the blade server, multiple mountable server units (that is, "blades") are inserted into a chassis of a standard height, to achieve a technical effect of high availability and high density (HAHD).

Figure 1:
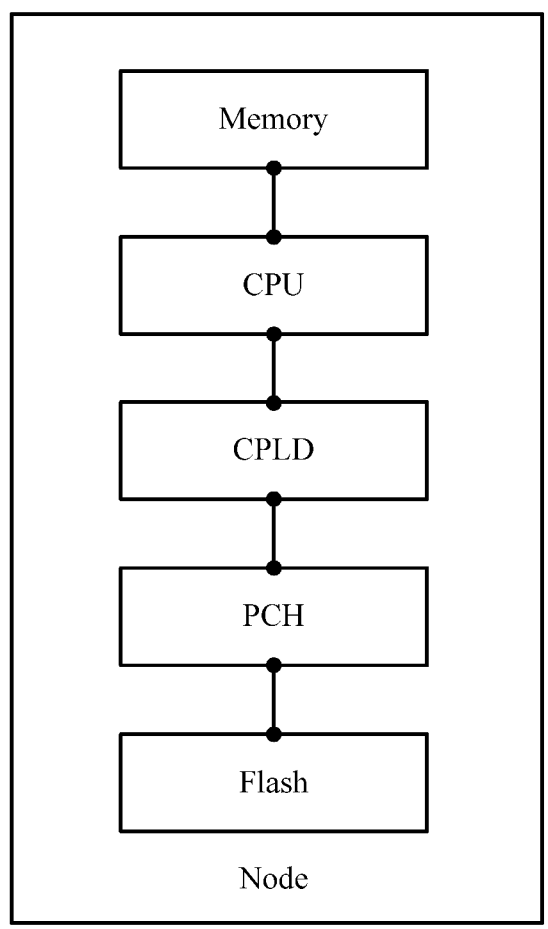
FIG. 1 is a schematic structural diagram of a single node.

Each mountable server unit in the blade server may be considered as a node. One blade server may include one or more nodes. For a basic structure of a single node, refer to FIG. 1. The node may include a central processing unit (CPU), a complex programmable logic device (CPLD), and a platform controller hub (PCH), and further includes storage parts such as a memory and a flash. The CPU assumes most computing functions of the node. The CPLD is configured to perform some simple logic control operations. The storage part such as the flash is mainly configured to store some data, programs, or instructions. The PCH is mainly responsible for controlling power-related operations such as power-on and power-off of the node, for example, loading a basic input/output system (BIOS) from the flash to power on the node.

Figure 2:
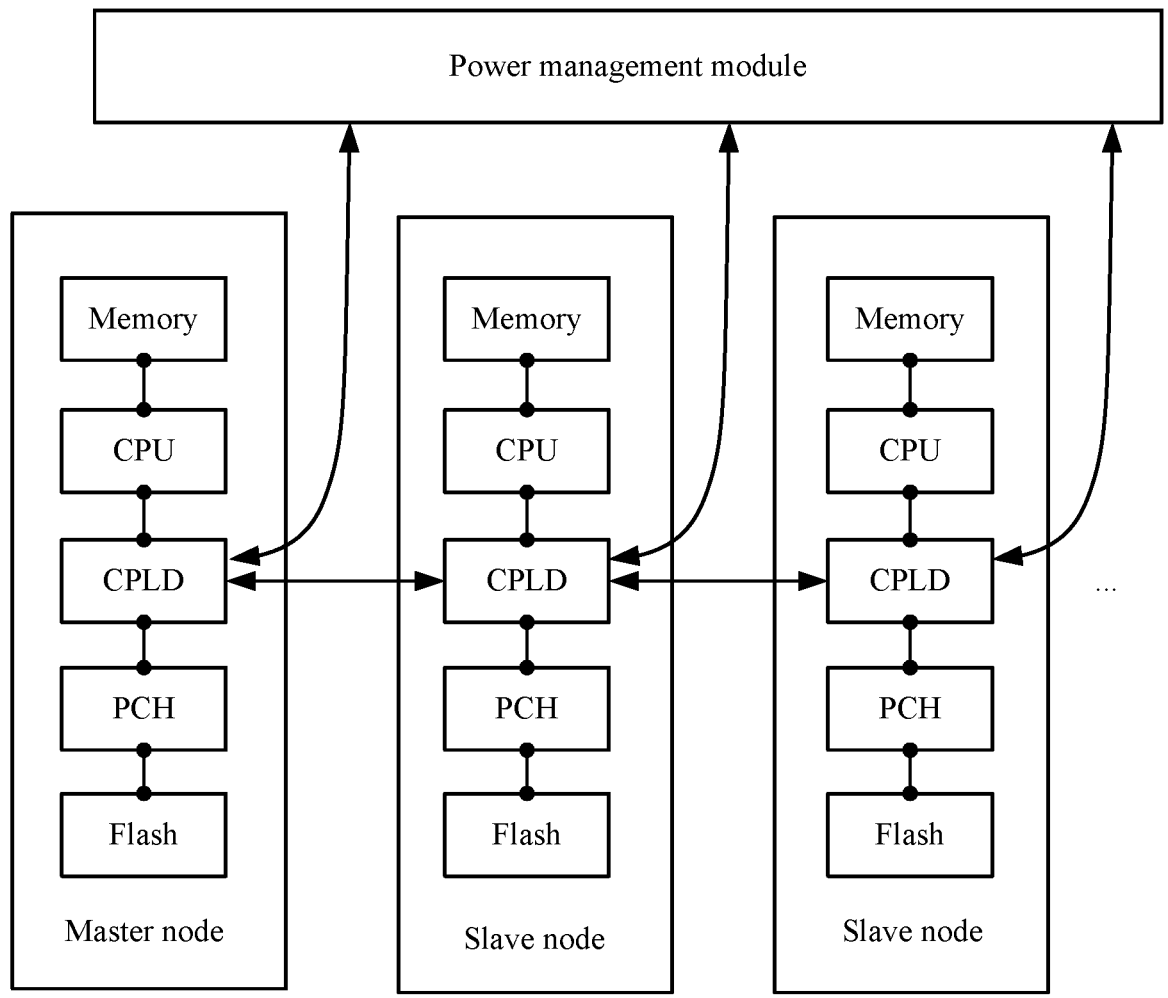
FIG. 2 is a schematic structural diagram of a multi-node system.

In a current blade server, multiple nodes are usually used to form a multi-node system, and a power management module is used to connect to CPLDs of the nodes, to manage power of the nodes, as shown in FIG. 2. For convenience of coordinated management of the multi-node system, the nodes usually need to be powered on together and/or powered off together. In addition, to ensure that the nodes are powered on or powered off together, in the prior art, a master node is usually selected from the multiple nodes, and other nodes act as slave nodes. A PCH of the master node is responsible for managing functions such as power-on and power-off of all the nodes together, to ensure consistency between the nodes. PCHs of the slave nodes are not used, and may be set to a sleep state.

However, in actual application, when a PCH of one node is used to manage power-on and power-off of all nodes, the PCH of the master node needs to load a BIOS for each slave node, and consequently, a workload of the PCH of the master node is relatively heavy, a relatively long power-on delay is caused, and a good power-on effect cannot be achieved.

To resolve the foregoing problem, this application provides a power management method based on a multi-node system shown in FIG. 2. For a basic process of the method, refer to FIG. 3.

At 301, a power management module sends a power-on instruction to each node.

The power management module determines, after receiving an instruction from a user or in another case, that a multi-node system is to be powered on, and sends the power-on instruction to each node, to instruct to power on the node. Each node in the multi-node system receives the power-on instruction.

At 302, each node is powered on according to the received power-on instruction.

After receiving the power-on instruction sent by the power management module, each node in the multi-node system starts to be powered on. A power-on operation of each node is controlled by a local PCH of the node, and the power-on operations of the nodes are independent of each other.

After each node receives the power-on instruction, the PCH generates a CPU power OK signal (for example: the PCH generates a CPU_PG signal), and a CPLD forwards the signal to a CPU, so that a CPU board is powered on. After the board is powered on, the CPLD sends a system power OK signal (for example: the CPLD sends a SYS_PWEOK signal) to the PCH. After receiving the SYS_PWEOK signal, the PCH sends a platform reset signal (for example: the PCH sends a PLT_RST signal) to the CPLD, to trigger platform reset.

However, if each node is powered on in a completely independent manner, the multi-node system may have poor consistency. Optionally, to ensure consistency between the nodes, in this embodiment of the present disclosure, after receiving the CPU_PG signal sent by the PCH, the CPLD does not directly send the CPU_PG signal to the CPU, but reports the CPU_PG signal to the power management module. After receiving the CPU_PG signals of all the nodes, the power management module delivers the CPU_PG signal to the CPLD of each node according to a time interval requirement that the nodes are powered on at different times. Then, the CPLD of the node sends, to the CPU, the CPU_PG signal that is from the power management module. According to this method, the CPU board of each node can be powered on according to the time interval requirement that the nodes are powered on at different times, and the system has relatively good power-on consistency.

Similarly, optionally, after receiving the PLT_RST signal sent by the PCH, the CPLD does not directly trigger platform reset, but reports the PLT_RST signal to the power management module. After receiving the PLT_RST signals of all the nodes, the power management module delivers the PLT_RST signal to the CPLD of each node. After receiving the PLT_RST signal from the power management module, the CPLD of the node triggers platform reset.

Optionally, because a power-on operation of each node is controlled by a local PCH of the node regardless of a master node or a slave node, the PCH of each node may load a BIOS from a local flash. However, if each node loads the BIOS from the local flash, node consistency of the multi-node system certainly cannot be ensured. Therefore, optionally, a PCH of the slave node may load a BIOS from a local flash only at an initial stage of power-on, and after a local memory is initialized, continue to load a BIOS from a flash of the master node instead. In this way, all nodes continue to load the BIOS from the flash of the master node after the memory is initialized, so that relatively high consistency can be ensured after power-on.

At 303, a PCH of a slave node is switched to a sleep state.

After the node is powered on, the PCH ends a power-on process, so that a workload is greatly reduced. In this case, a PCH of only one node needs to be used to manage power of all the nodes. Therefore, in this embodiment of the present disclosure, the PCH of the slave node is switched to the sleep state after the slave node is powered on, and does not lead a power management operation of the slave node any longer. Power management of each node is led by a PCH of the master node instead.

Steps 301 to 303 describe in detail how the multi-node system performs the power-on process in the power management method provided in the present disclosure. After the power management module sends the power-on instruction to each node in the multi-node system, the PCH of each node loads the BIOS from the local flash to perform the power-on process. Compared with the prior art in which a PCH of a master node is responsible for loading BIOSs of all nodes in a multi-node system, the method provided in this embodiment of the present disclosure can reduce burden on the PCH of the master node, and accelerate a power-on speed of the system, so that a better power-on effect is achieved.

The power management method provided in this embodiment of the present disclosure not only may relate to the power-on process, but may also include a corresponding power-off process. For the specific power-off process, refer to steps 304 to 308.

At 304, a PCH of a master node sends, to the power management module, a sleep control signal that is pulled down.

It is mentioned in step 303 that after the power-on process ends, the power management of each node is led by the PCH of the master node instead. Therefore, the power-off process of the multi-node system is also led by the PCH of the master node. Therefore, when the multi-node system is to be powered off, the PCH of the master node pulls down the sleep control signal, and sends, to the power management module, the sleep control signal that is pulled down. The sleep control signal is used to instruct to power off the nodes. The sleep control signal may be any one of an SLP_S0 signal to an SLP_S5 signal. No limitation is set herein.

The PCH of the master node may determine, in multiple cases, that the multi-node system is to be powered off. The PCH of the master node may determine, after receiving a power-off instruction sent by a user, a node, or another device, that the multi-node system is to be powered off, and trigger the operation of pulling down the sleep control signal. Alternatively, the PCH of the master node may determine, when a CPU of the master node generates a thermal_trip signal (THRMTRIP signal), that the multi-node system is to be powered off, and trigger the operation of pulling down the sleep control signal. Alternatively, after generating a THRMTRIP signal, a CPU of the slave node may report the generated THRMTRIP signal to the power management module, and the power management module delivers the THRMTRIP signal to the PCH of the master node. After receiving the THRMTRIP signal of the slave node, the PCH of the master node determines that the multi-node system is to be powered off, and triggers the operation of pulling down the sleep control signal.

At 305, the master node is powered off.

The master node is powered off after sending the sleep control signal to the power management module.

At 306, the power management module sends the sleep control signal to each slave node.

After receiving the sleep control signal, the power management module sends the sleep control signal to each slave node, so that the slave node may be powered off according to the sleep control signal. A CPLD of each slave node receives the sleep control signal.

At 307, the slave node is powered off according to the received sleep control signal.

Each slave node is powered off after receiving the sleep control signal. It should be noted that the power-off process provided in this embodiment of the present disclosure is an irregular power-off process. Therefore, the slave node needs to isolate abnormal power-off information during power-off, so that the power-off process that is of the slave node and that is triggered by the sleep control signal is not considered as abnormal power-off.

At 308, the PCH of the slave node pulls down the local sleep control signal.

After the slave node is powered off, the slave node may pull down the local sleep control signal of the slave node by continuously pulling down a power button signal (PWR_BTN signal) of the PCH for four seconds by using a baseboard management controller (baseboard management controller, BMC for short), or in another manner. This ensures that statuses of the PCHs of the nodes in the multi-node system may be consistent when the multi-node system starts a next power-on process.

The foregoing steps 304 to 308 describe the power-off process of the multi-node system provided in the present disclosure. A hot reset process of the multi-node system provided in the present disclosure is described below.

Generally, a CPU and a PCH of a node are connected by using a DMI bus. The PCH of the slave node does not lead the power management operation any longer after the multi-node system is powered on, and the DMI bus does not support hot swapping, either. Therefore, a DMI bus of the slave node is usually in a disabled state after the multi-node system is powered on. Consequently, when the multi-node system attempts to perform hot reset, the PCH of the slave node cannot send a hot reset request to the CPU by using the DMI bus, and further cannot receive, from the CPU, an acknowledgement message for the hot reset request. In this case, the PCH does not perform hot reset, but it is considered that the system runs with errors, and cold reset is performed. For implementing hot reset in the multi-node system, in this embodiment of the present disclosure, before the hot reset, the CPLD of the slave node pulls down a PCH power OK signal (PCH_PWROK signal) and an SYS_PWROK signal, to reactivate the DMI bus between the PCH and the CPU of the slave node. Then, each node performs a hot reset operation. After completing the hot reset operation, the slave node disables the DMI bus. With this method, in this embodiment of the present disclosure, hot reset of the multi-node system is implemented while hot swapping is still supported. Therefore, flexibility of the multi-node system is improved.

Figure 3:
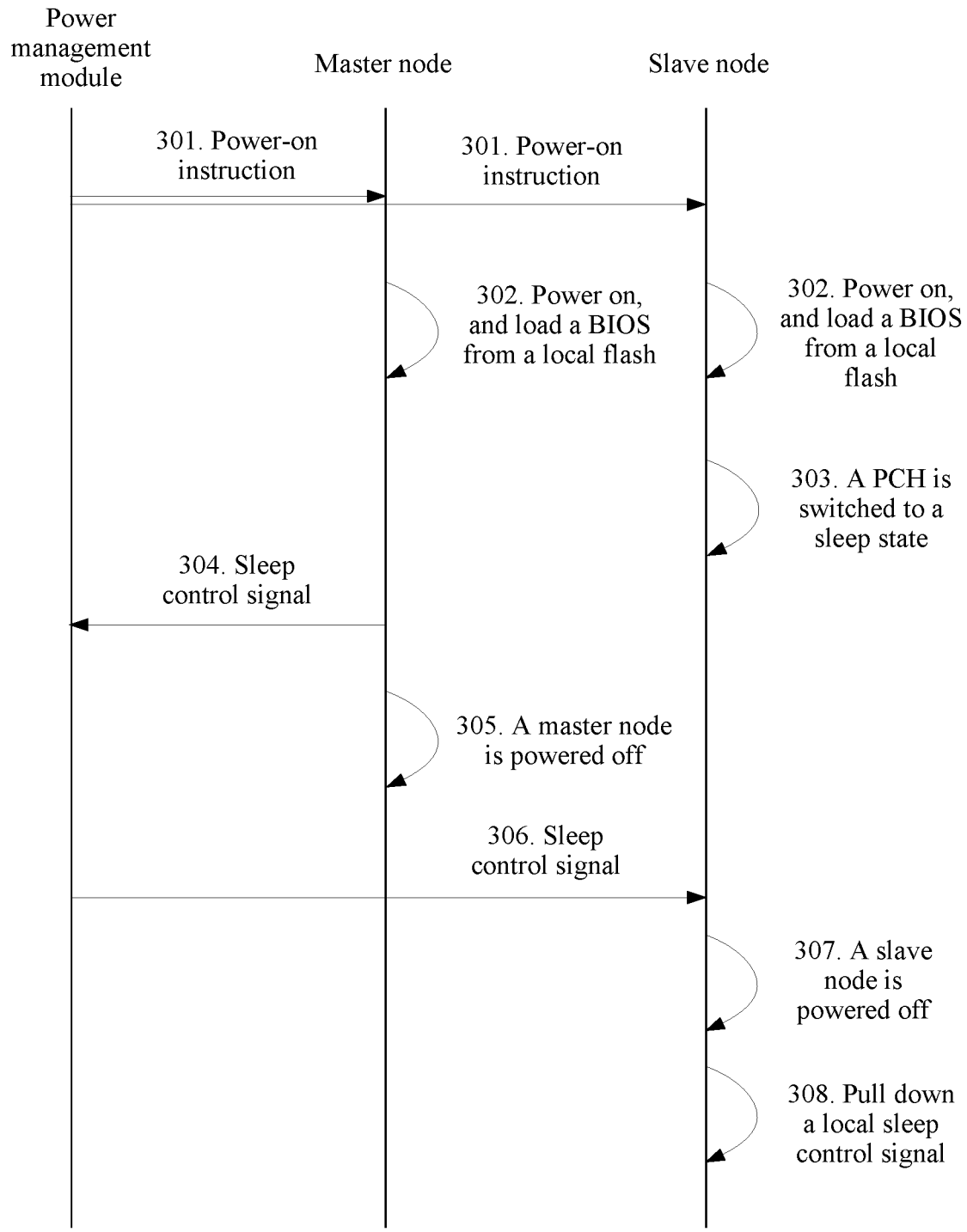
FIG. 3 is a flowchart of an embodiment of a power management method according to the present disclosure.

A basic process of the power management method provided in the present disclosure is described in the embodiment shown in FIG. 3. A multi-node system is described below with reference to FIG. 2. During running, the multi-node system performs the power management method shown in FIG. 3.

A power management module in the multi-node system sends a power-on instruction to each node, to instruct to power on the node. Each node in the multi-node system receives the power-on instruction. After receiving the power-on instruction sent by the power management module, each node in the multi-node system starts to be powered on. At an initial stage of power-on, each node loads a BIOS from a local flash. However, after a memory of a slave node is initialized, a PCH of the slave node continues to load a BIOS from a flash of a master node instead. During power-off, a PCH of the master node pulls down a local sleep control signal of the master node, sends, to the power management module, the sleep control signal that is pulled down, and then controls to power off the master node. After receiving the sleep control signal, the power management module sends the sleep control signal to each slave node in the system. After receiving the sleep control signal, the slave node is powered off, and pulls down the local sleep control signal of the slave node after being powered off. The operation of pulling down the local sleep control signal by the PCH of the master node may be triggered after the PCH of the master node receives a power-off instruction, or triggered after a CPU of the master node generates a thermal_trip signal, or triggered after the master node receives a thermal_trip signal sent by the power management module. No limitation is set herein. If the multi-node system needs to perform a hot reset operation, a CPLD of the slave node activates a DMI bus between a local CPU and the PCH, and then each node in the system performs the hot reset operation. After completing the hot reset operation, the slave node disables the DMI bus.

For detailed explanation how the multi-node system executes the power management method, refer to related descriptions in the method embodiment shown in FIG. 3. Details are not described herein again.

In the several embodiments provided in this application, it should be understood that the disclosed system, apparatus, and method may be implemented in other manners. For example, the described system embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections via some interfaces, apparatuses or units, and may be implemented in electronic, mechanical, or other forms.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes: any medium that can store program code, such as a Universal Serial Bus (USB) flash drive, a removable hard disk, a read-only memory (ROM), a random access memory (RAM), a magnetic disk, or an optical disc.

The foregoing embodiments are merely intended for describing the technical solutions of the present disclosure, but not for limiting the present disclosure. Although the present disclosure is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A power management method, applicable to a multi-node server system, wherein the multi-node server system comprises a power management module, one master server node, and at least one slave server node, each of the server nodes comprises a platform controller hub (PCH) for controlling power-related operations and a flash, and the method comprises:

receiving, by a first slave server node, a power-on instruction sent by the power management module, wherein the first slave server node is any one of the at least one slave server node, and the power-on instruction is used to instruct each of the at least one slave server node to power on;

uploading, by the PCH of the first slave server node, a basic input output system (BIOS) from the flash of the first slave server node according to the power-on instruction to perform a first slave server node power-on operation controlled by the PCH of the first slave server node;

switching, by the first slave server node, the PCH of the first slave server node to the sleep state after the first slave server node is powered on;

activating, by a complex programmable logic device (CPLD) of the first slave server node, a Direct Media Interface (DMI) bus between a CPU and the PCH of the first slave server node;

performing, by the first slave server node, a hot reset operation; and disabling, by the first slave server node, the DMI bus between the CPU and the PCH of the first slave server node after performing the hot reset operation.

2. The power management method according to claim 1, wherein the uploading a BIOS from the flash of the first slave server node according to the power-on instruction to perform a power-on operation comprises:

loading, by the PCH of the first slave server node, the BIOS from the flash of the first slave server node until a local memory has been initialized; and loading, by the PCH of the first slave server node, a BIOS from a flash of the master server node continuously after the memory of the first slave server node has been initialized.

3. The power management method according to claim 1, wherein the method further comprises:

pulling down, by a PCH of the master server node, a first sleep control signal of the master server node, and sending, to the power management module, the first sleep control signal of the master server node that is pulled down;

sending, by the power management module, a second sleep control signal to the at least one slave server nodes after receiving the first sleep control signal of the master server node; and powering off the at least one slave server node after the at least one slave server node receives the second sleep control signal, and pulling down a sleep control signal of the first slave server node after power-off.

4. The power management method according to claim 3, wherein before the pulling down, by the PCH of the master server node, a first sleep control signal of the master server node, the method further comprises:

receiving, by the PCH of the master server node, a power-off instruction, to trigger the operation of pulling down the first sleep control signal of the master server node; or generating, by a central processing unit (CPU) of the master server node, a thermal_trip signal, to trigger the operation of pulling down the sleep control signal of the master server node; or receiving, by the master server node, a thermal_trip signal sent by the power management module, to trigger the operation of pulling down the sleep control signal of the master server node.

5. A multi-node server system, wherein the multi-node server system comprises a power management module, one master server node, and at least one slave server node, each of the server nodes comprises a platform controller hub (PCH) for controlling power-related operations and a flash, wherein, the power management module is configured to send a power-on instruction to a first slave server node, wherein the first slave server node is any one of the at least one slave server node, and the power-on instruction is used to instruct each of the at least one slave server node to power on;

the PCH of the first slave server node is configured to load a basic input output system (BIOS) from the flash of the first slave server node according to the power-on instruction to perform a first slave server node power-on operation controlled by the PCH of the first slave server node, and switch to a sleep state after the first slave server node is powered on; and a complex programmable logic device (CPLD) of the first slave server node is further configured to activate a direct media interface (DMI) bus between a CPU of the first slave server node and a PCH of the first slave server node, perform a hot reset operation, and disable the DMI bus between the CPU of the first slave server node and the PCH of the first slave server node after performing the hot reset operation.

6. The multi-node server system according to claim 5, wherein the PCH of first slave server node is further configured to load the BIOS from the flash of the first slave server node until a memory of the first slave server node is initialized; and the PCH of the first slave server node is further configured to load a BIOS from a flash of the master server node continuously after the memory of the first slave server node has been initialized.

7. The multi-node server system according to claim 5, wherein a PCH of the master server node is further configured to pull down a first sleep control signal, send, to the power management module, the first sleep control signal that is pulled down, and then power off the master server node;

the power management module is further configured to send a second sleep control signal to the at least one slave server nodes after receiving the first sleep control signal sent by the PCH of the master server node; and the first slave server node is further configured to be powered off after receiving the second sleep control signal, and pull down a sleep control signal of the first slave server node after being powered off.

8. The multi-node server system according to claim 7, wherein the PCH of the master server node is further configured to receive a power-off instruction, to trigger the operation of pulling down the first sleep control signal; or a CPU of the master server node is further configured to generate a thermal_trip signal, to trigger the operation of pulling down the first sleep control signal by the PCH of the master server node; or the power management module is further configured to send a thermal_trip signal to the master server node, to trigger the operation of pulling down the first sleep control signal by the PCH of the master server node.

* * * * *